US00RE42405E

(19) United States
(12) Reissued Patent
Fujinaga et al.

(10) Patent Number: US RE42,405 E
(45) Date of Reissued Patent: May 31, 2011

(54) METHOD FOR FORMING PARTITIONS OF PLASMA DISPLAY PANEL BY USING SANDBLASTING PROCESS

(75) Inventors: Akihiro Fujinaga, Kanagawa (JP); Kazunori Ishizuka, Miyazaki (JP); Tatsutoshi Kanae, Kanagawa (JP); Kazuhide Iwasaki, Kanagawa (JP); Toshiyuki Nanto, Kanagawa (JP); Yoshimi Kawanami, Kanagawa (JP); Masayuki Shibata, Kanagawa (JP); Yasuhiko Kunii, Kanagawa (JP); Tadayoshi Kosaka, Kanagawa (JP); Osamu Toyoda, Kanagawa (JP); Yoshimi Shirakawa, Kanagawa (JP)

(73) Assignees: Fujitsu Hitachi Plasma Display Limited, Kanagawa (JP); Hitachi Plasma Patent Licensing Co., Ltd., Tokyo (JP)

(21) Appl. No.: 12/328,197

(22) Filed: Dec. 4, 2008

Related U.S. Patent Documents

Reissue of:
(64) Patent No.: 6,855,026
Issued: Feb. 15, 2005
Appl. No.: 10/680,136
Filed: Oct. 8, 2003

U.S. Applications:
(60) Division of application No. 11/705,796, filed on Feb. 14, 2007, now Pat. No. Re. 41,312, which is a continuation of application No. PCT/JP02/03362, filed on Apr. 2, 2002.

(30) Foreign Application Priority Data

Apr. 9, 2001 (JP) ..... 2001-110647

(51) Int. Cl.
*H01J 17/49* (2006.01)

(52) U.S. Cl. ..... 313/582; 445/24; 445/25; 445/29; 445/30; 451/29; 451/30; 313/583; 313/584; 313/585; 313/586; 313/587

(58) Field of Classification Search ..... 445/24–25, 445/29–30; 451/29–30; 313/582–587
See application file for complete search history.

(56) References Cited

U.S. PATENT DOCUMENTS 5,684,362 A 11/1997 Togawa
(Continued)

FOREIGN PATENT DOCUMENTS

EP 1017081 A2 7/2000
(Continued)

OTHER PUBLICATIONS

Display Technologies III Jul. 26-27, 2000 Taipei, Taiwan, vol. 4079, 2000, pp. 70-78, XP002446415 Proceedings of the SPIE—The International Society For Optical Engineering SPIE—Int. Soc. Opt. Eng USA, ISSN 0277-786X.
New Cell Structure And New Driving Method for PDPs, Taniguchi et al, ISSN 0913-5685, vol. 99, No. 597 Jan. 27, 2000.

*Primary Examiner* — Toan Ton
*Assistant Examiner* — Hana S Featherly
(74) *Attorney, Agent, or Firm* — Antonelli, Terry, Stout & Kraus, LLP.

(57) ABSTRACT

A partition is formed by the process including a step for providing a sheet-like partition material that covers a display area and outside thereof on the surface of the substrate, a step for providing a mask for patterning that covers the display area and the outside thereof, so that a pattern of the portion arranged outside of the display area of the mask is a grid-like pattern, a step for patterning the partition material covered partially with the mask by a sandblasting process, and a step for baking the partition material after the patterning.

33 Claims, 9 Drawing Sheets

U.S. PATENT DOCUMENTS

| | | | |
|---|---|---|---|
| 5,989,089 | A | 11/1999 | Ichiyoshi et al. |
| 6,048,243 | A | 4/2000 | Kosaka et al. |
| 6,249,264 | B1 | 6/2001 | Sano et al. |
| 6,400,080 | B1 | 6/2002 | Tanaka |
| 6,465,956 | B1 | 10/2002 | Koshio |
| 6,638,129 | B2 | 10/2003 | Sano et al. |
| 6,683,589 | B2 | 1/2004 | Sano et al. |
| 2001/0019318 | A1 | 9/2001 | Sano et al. |
| 2001/0026255 | A1 | 10/2001 | Sano et al. |
| 2002/0110759 | A1 | 8/2002 | Lin et al. |

FOREIGN PATENT DOCUMENTS

| | | |
|---|---|---|
| JP | 7-045193 | 2/1995 |
| JP | 11-007897 | 1/1999 |
| JP | 11-191377 | 7/1999 |
| JP | 11-213896 | 8/1999 |
| JP | 2000-311612 | 11/2000 |
| JP | 2001-052616 | 2/2001 |
| JP | 2001-236890 | 8/2001 |

METHOD FOR FORMING PARTITIONS OF PLASMA DISPLAY PANEL BY USING SANDBLASTING PROCESS

Matter enclosed in heavy brackets [ ] appears in the original patent but forms no part of this reissue specification; matter printed in italics indicates the additions made by reissue.

*This is a divisional reissue application of U.S. Reissue application Ser. No. 11/705,796, filed Feb. 14, 2007 now U.S. Pat. No. R,E41,312, which is a Reissue of U.S. Ser. No. 10/680,136, filed Oct. 8, 2003, now U.S. Pat. No. 6,855,026, contents of which are incorporated by reference herein.*

This application is a continuing application, filed under 35 U.S.C. §111(a), of InternationalApplication PCT/JP02/03362, filed Apr. 2, 2002, it being further noted that foreign priority benefit is based upon Japanese Patent Application 2001-110647, filed Apr. 9, 2001.

TECHNICAL FIELD

The present invention is related to a method for forming partitions for manufacturing a plasma display panel (PDP) having partitions in a display area, and the invention can be applied to formation of partition using a sandblasting method.

BACKGROUND ART

A surface discharge type PDP that is used for a color display has partitions for preventing discharge interference between neighboring cells. There are two partition arrangement patterns. One is a stripe pattern in which a display area is divided into columns of a matrix display, and another is a mesh pattern in which the display area is divided into cells. When the stripe pattern is adopted, a plurality of partitions, each of which having a band-like shape in a plan view, is arranged in the display area. When the mesh pattern is adopted, a partition (a so-called box rib) having a shape surrounding each cell in a plan view is arranged in the display area.

In general, a partition is a baked material of low melting point glass and is formed by using a sandblasting method. FIG. 12 shows the conventional process of forming a partition. The partition pattern shown in FIG. 12 is a stripe pattern. The partition is formed by the following steps. (A) Paste of low melting point glass is applied to a surface of a glass substrate 101 at a uniform thickness and is dried. Then, a sheet-like partition material 102a made of the dried paste is covered with a photo-sensitive resist film 103a that is a masking material. (B) A photolithography technique including exposure of the pattern and development of the same is used for forming masks 103 of a pattern corresponding to the partition. (C) A cutting material is blown to cut portions of the partition material 102a that are not masked. In this process, a spray nozzle is moved in a reciprocating manner along the longitudinal direction of the bands of the mask pattern, so that the wide area of the partition material 102a is dug down equally and gradually. (D) The masks 103 that are remained on the patterned partition material 102b are removed. (E) The partition material 102b is baked so that a partition 112 is obtained. In the baking process, the volume of the partition material 102b is reduced due to dissipation of binder.

As shown in FIG. 12(C) of the sandblasting step, the partition material 102b is scooped out under the mask 103 at ends of the mask 103 in the direction along the movement of the nozzle so that side cuts are formed. This is caused by that a part of the cutting material ejected from the nozzle is reflected by the glass substrate 101, meets the cutting material ejected from the nozzle, and has a moving component in parallel with the direction of the nozzle movement so that the cutting material having the components scoop out the ends of the partitions. Quantity of the side cuts becomes greater as a cutting speed increases. It is considered to be the reason that a ratio of the above-mentioned component increases when quantity of a cutting material ejected per unit time is increased. Hereinafter, the above-mentioned component that causes the side cut is referred to as a jet. This side cut induces mask exfoliation that is a cause of a pattering deficiency during the cutting stage. In addition, the side cut prevents the partition 112 from being formed in uniform height. When the partition material 102b having curved edges as shown in FIG. 12(D) is baked, the edge portions of the partition 112 become higher than other portions as shown in FIG. 12(E). More specifically, concerning a partition having a design value of height of 140 μm, it has a height of approximately 200 μm before the baking process. After being baked the height is reduced to approximately 70%, and the edge portions become higher than the other portions by 30 μm. This phenomenon is called a "projection", and it is caused by that the top portion is free while the bottom portion is restrained from contracting since it is stuck to the glass substrate 101. The projection causes insufficient contact between substrates in a PDP assembling process in which a substrate having the partition 112 is put together with another substrate. If the PDP has a gap between the surfaces to contact with each other, the substrates may vibrate locally due to electrostatic attraction when a high frequency driving voltage is applied for a display, resulting in slight operation sound (buzz sound).

Studying about the relationship between the phenomenon and the quantity of the projection of each portion in the panel, it is found that this phenomenon is prevented by reducing the quantity of the projection to a half of the current value, i.e., 16 μm or less, preferably 12 μm or less considering variation in the manufacturing process.

An object of the present invention is to provide a method for forming partitions of the exact pattern and height as designed in a display area without generating any projections that can be obstacles to contact between substrates.

DISCLOSURE OF THE INVENTION

According to a method for forming partitions of the present invention, when patterning a partition material that is masked partially by blasting a cutting material, the partition material is masked so as to form a sub partition that is connected to a partition in a display area (a main partition) outside the display area, thereby side cuts are generated outside the display area. In addition, the sub partition is formed as a grid-like pattern so that the side cuts can be generated in wide area for reducing the depth of the side cuts. When the side cuts are minute, mask exfoliation hardly happens, and a projection in baking scarcely occurs.

In a preferred embodiment, the partition material is masked so that the auxiliary partition for reducing the side cuts of the sub partition is formed outside the sub partition. When the edge portion of the auxiliary partition is protruded from the display area, the effect of protecting the sub partition in a cutting process is enhanced. Concerning the auxiliary partition too, the projection is prevented so that no disturbance is generated for contact between the substrates. As a measure for the prevention, the pattern of the auxiliary partition is made as a ring pattern. The ring pattern reduces concentration of stress due to thermal contraction so that the projection hardly occurs. As another measure for the prevention, a size of the pattern is set less than a predetermined value. Specifically, it is set to 240 μm or less. When forming a partition having the height of 140 μm by baking the partition material having the thickness of 200 μm, if the size of the pattern in the depth direction of the side cuts is 240 μm or less, the projection is very little even if the depth of the side cuts is 50 μm. When manufacturing partitions of a plurality of PDPs at the same time, the side cuts are generated more easily in the middle portion of the substrate than in the edge portion since deviation of the cutting material is little in the middle portion. Therefore, it is preferable to provide the auxiliary partition at least between neighboring display areas. Other various structures of the method for forming partitions according to the present invention will be explained later with reference to drawings.

BEST MODE FOR CARRYING OUT THE INVENTION

The present invention will be described more in detail with reference to the attached drawings.

Figure 1:
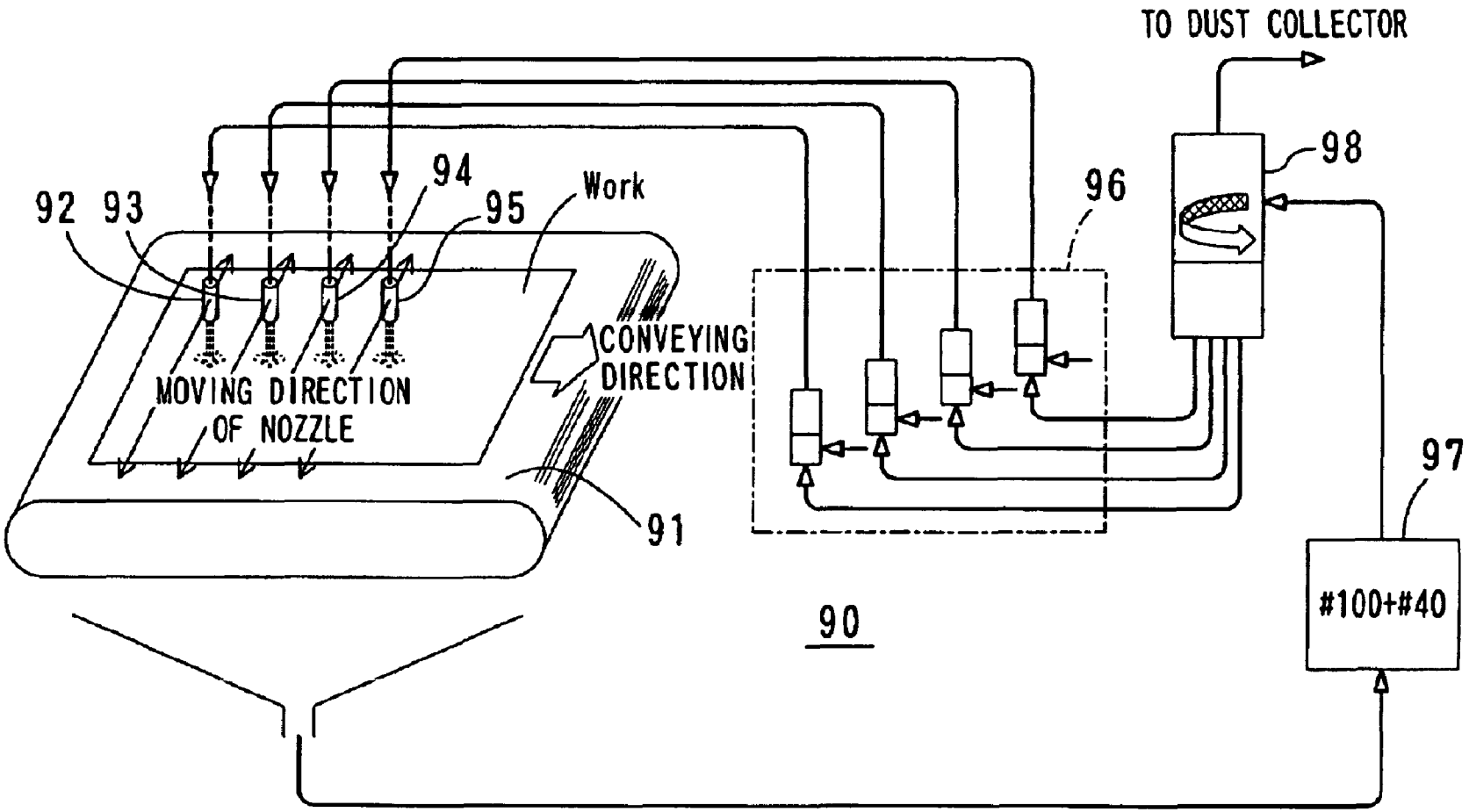
FIG. 1 is a schematic diagram of a sandblasting apparatus that is used for a method of the present invention.

FIG. 1 is a schematic diagram of a sandblasting apparatus that is used for a method of the present invention. The sandblasting apparatus 90 comprises a conveyor 91, four nozzles (also called blast guns) 92, 93, 94 and 95, a flow control block 96, a filter 97, and a cyclone 98. The conveyor 91 moves a work that was conveyed into a work room slowly from the left side to the right side in FIG. 1. The nozzles 92, 93, 94 and 95 move in a reciprocating manner in the direction perpendicular to the direction of conveying the work. The flow control block 96 mixes a cutting material and compressed gas, and the mixture is sent to the nozzles 92, 93, 94 and 95. The cutting material is ejected from the tips of the nozzles 92, 93, 94 and 95 to cut away the work. Scattered cutting material is collected together with cuttings and is sent to the filter 97. The filter 97 has a role in removing cuttings larger than the cutting material. The cyclone 98 separates the cutting material that passed the filter 97 from minute cuttings. The cutting material separated by the cyclone 98 is sent to the flow control block 96 for reuse. The minute cuttings are sent to a dust collector.

(First Embodiment)

Figure 2:
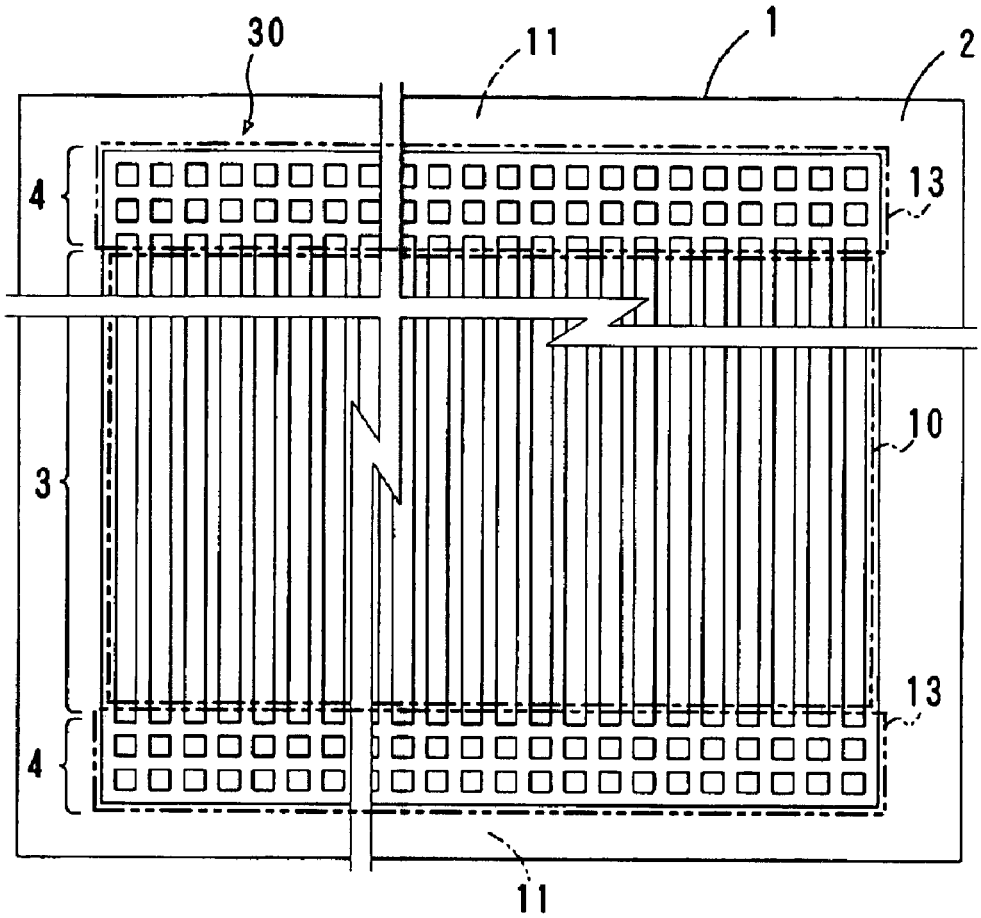
FIG. 2 is a plan view showing a mask pattern of a first embodiment.
Figure 12:
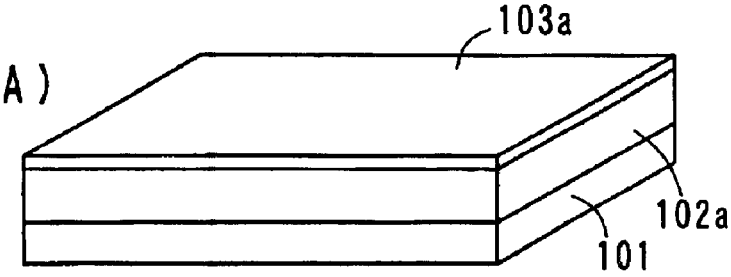
PRIOR ART FIG.12 (A)
FIG. 12(A) shows a first stage of forming a partition in the conventional process.
FIG. 12(B) shows a first stage of forming a partition in the conventional process.
FIG. 12(C) shows a first stage of forming a partition in the conventional process.
FIG. 12(D) shows a first stage of forming a partition in the conventional process.
FIG. 12(E) shows a first stage of forming a partition in the conventional process.
Figure 12:
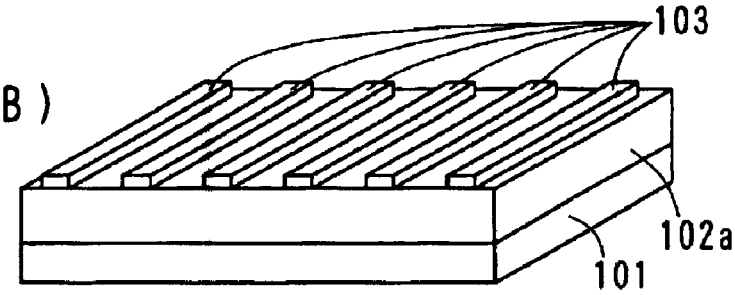
Figure 12:
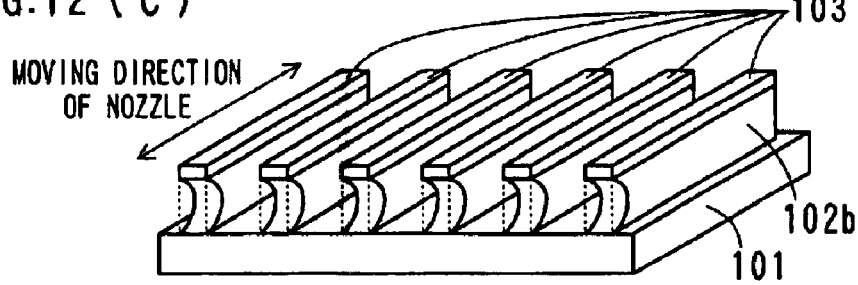
Figure 12:
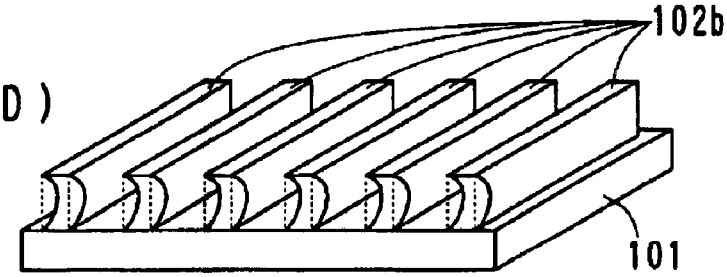
Figure 12:
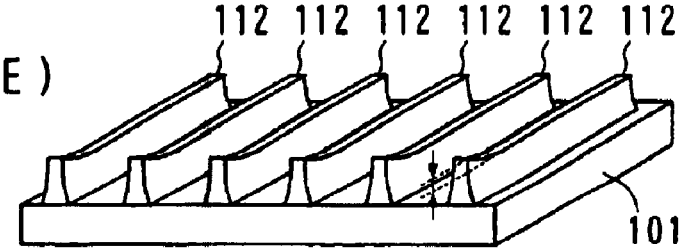

FIG. 2 is a plan view showing a mask pattern of a first embodiment. A partition pattern of the PDP of the first embodiment is a stripe pattern. The partition is formed basically in the same manner as the conventional process explained with reference to FIG. 12, which includes patterning a sheet-like partition material 2 that covers the entire surface of a glass substrate 1 that is a panel material by using a sandblasting process, and then baking the partition material 2. The difference from the conventional process is that a mask 30 used for patterning extends over a display area 10 and a non-display area 11 at both sides of the display area 10. The display area 10 means an area in which cells are formed on the glass substrate 1, and it corresponds to a display screen of a completed PDP. As to formation of the partition material 2, there are some methods similarly to the conventional process, i.e., a method of applying low melting point glass paste to the glass substrate 1 and drying the same, and a method of sticking a green sheet of low melting point glass onto the glass substrate 1. The mask 30 is made of a photo-sensitive resist. The glass substrate 1 has a size of 1030 mm×650 mm for manufacturing a 32-inch PDP.

A pattern of a portion of the mask 30 to be arranged in the display area 10 (hereinafter referred to as a main mask 3) is a stripe pattern corresponding to the partition to be formed, and it includes straight bands extending along the vertical direction in FIG. 2. A pattern of a portion of the mask 30 to be arranged at the outside of the display area 10 (hereinafter referred to as a sub mask 4) is a grid pattern that divides a band-like area 13 along the edge of the display area 10, and it comprises bands corresponding to the pattern of the display area 10 and a plurality of bands perpendicular thereto.

It is effective to move the nozzle along the longitudinal direction of bands in cutting a stripe pattern. The direction of moving the nozzle is the vertical direction in FIG. 2. In the cutting process in which the nozzle and the partition material 2 are moved relatively in a reciprocating manner, the sub mask 4 prevents excessive cutting at ends of each band of the stripe pattern. Since the rim of the sub mask 4 is continuous over the entire length in the lateral direction of the display area 10 (i.e., the moving direction for cutting), quantity of the cutting material ejected directly to the edge surface of the sub mask 4 per unit area is less than that in discontinuous case. Thus, the side cuts at the edge surface of the sub mask 4 can be reduced. In addition, thanks to the sub mask 4, the cutting material reflected by the sub mask 4 and the cutting material directly from the nozzle interfere with each other, so that the cutting process is performed equally in the edge portions and the middle portion of the main mask 3.

Since the reduction of the side cuts suppresses mask exfoliation and decreases a projection in the baking process, partitions can be formed of the exact pattern and height as designed in a display area without any obstruction in contact between the substrates. In addition, the sub partition arranged at the outside of the display area prevents incomplete contact between the substrates.

Figure 3:
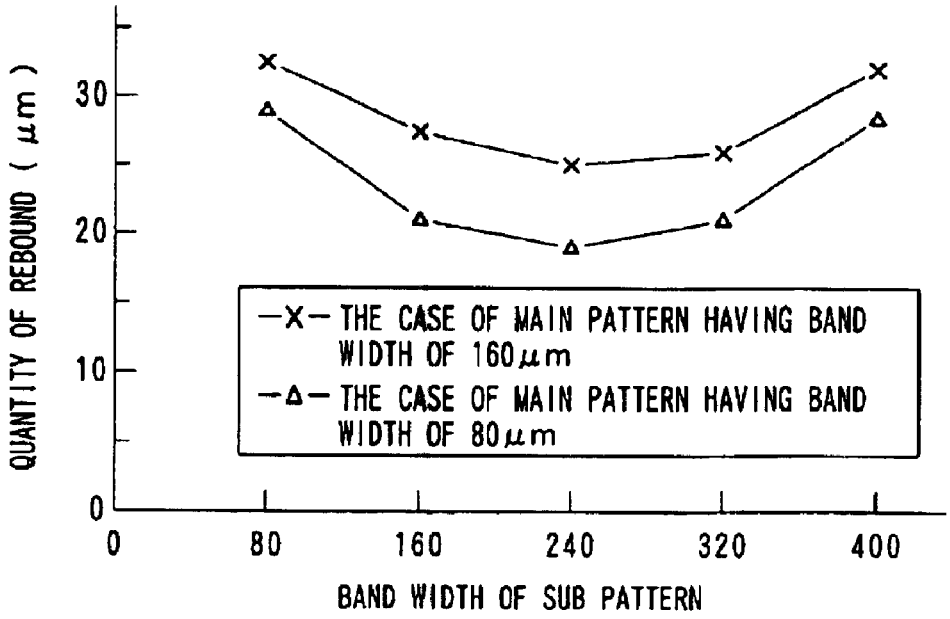
FIG. 3 is a graph showing the relationship between a band width of a mask pattern and quantity of a projection.

FIG. 3 is a graph showing the relationship between a band width of a mask pattern and quantity of a projection. As shown in FIG. 3, the quantity of a projection depends on the band width of the pattern of the sub mask 4 (sub pattern). When the band width of the pattern of the main mask 3 (main pattern) is either 80 μm or 160 μm, the quantity of a projection can be minimized by setting the band width of the sub pattern, i.e., the band width of the partition that is formed in the direction perpendicular to the stripe partition to the value of 240 μm. By setting the band width of the sub pattern to a value within 160-320 μm, the projection can be reduced. Although the depth of the side cut is 50 μm in FIG. 3, the quantity of the side cut can be close to zero by using an auxiliary partition or others that will be explained later, so that the quantity of a projection can be reduced to 12 μm or less when the band width of the sub pattern is set to a value of 240 μm.

(Second Embodiment)

Figure 4:
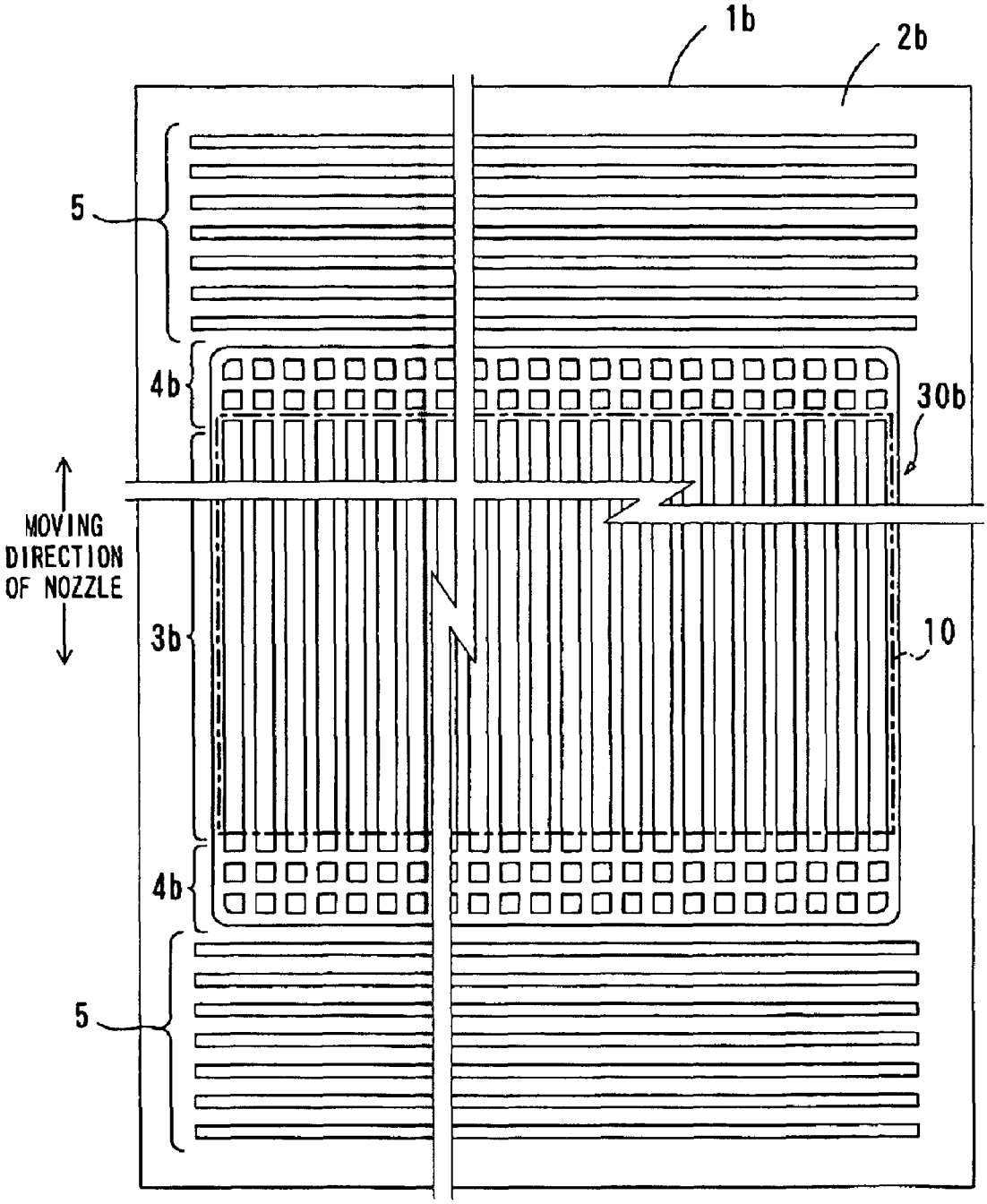
FIG. 4 is a plan view showing a mask pattern of a second embodiment.
Figure 5:
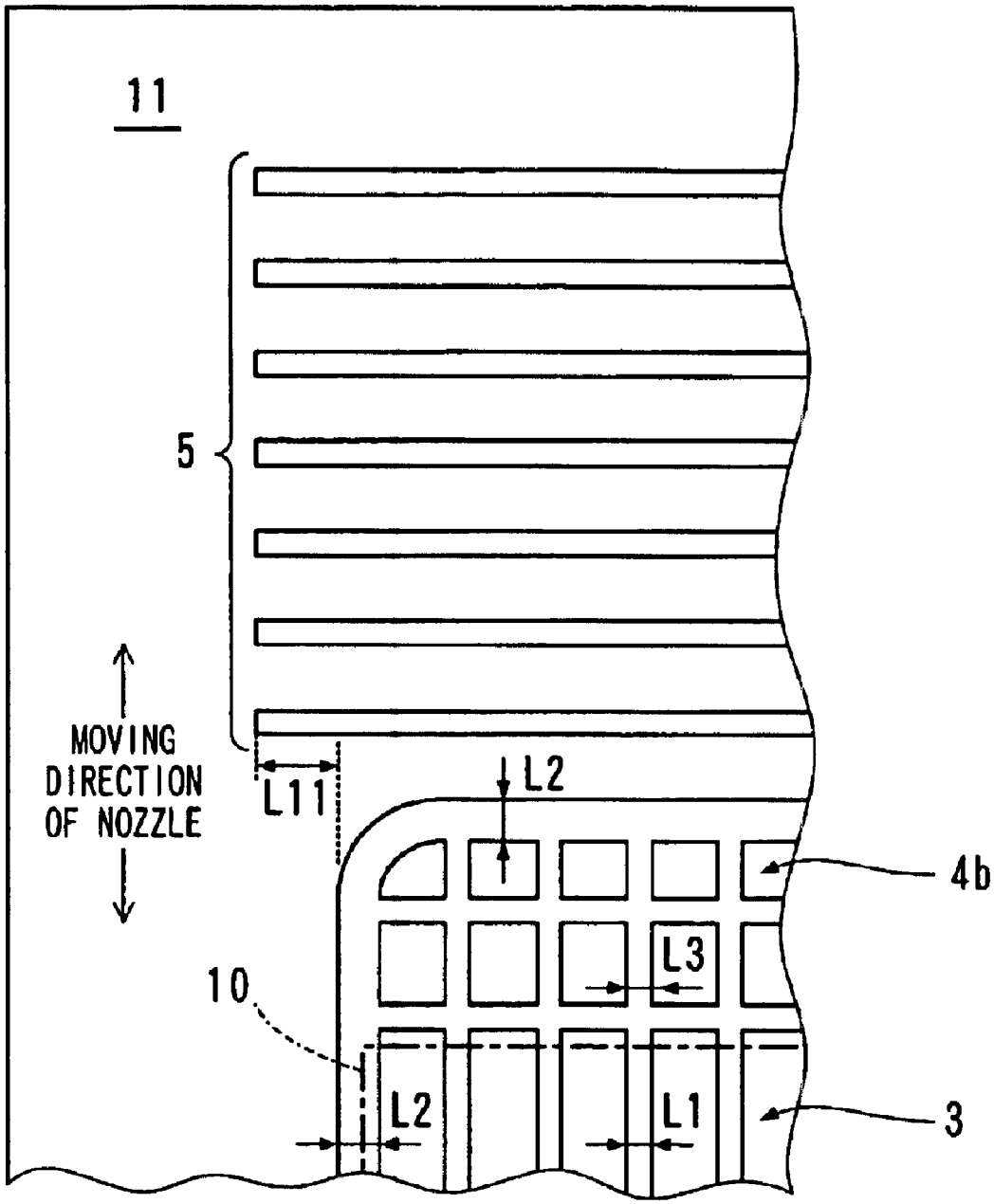
FIG. 5 is a diagram showing an enlarged part of the mask pattern of the second embodiment.

FIG. 4 is a plan view showing a mask pattern of a second embodiment. FIG. 5 is a diagram showing an enlarged part of the mask pattern of the second embodiment. In the PDP of the second embodiment, the partition pattern is also a stripe pattern. The partition is formed in the same way as the first embodiment, which includes patterning a sheet-like partition material 2b that covers the entire surface of a glass substrate 1b by using a sandblasting process and a mask 30b that is a unit of a main mask 3b and a sub mask 4b, and then baking the partition material 2b. The second embodiment has three characteristics as follows.

(1) At the same time as forming the mask 30b, auxiliary masks 5 are formed at both sides of the mask 30b and separated from the mask 30b.

(2) Among bands that constitute the pattern of the sub mask 4b and are formed in the direction perpendicular to the stripe partition, the most outside band is thicker than bands constituting the pattern of the main mask 3b.

(3) The corner portion of the sub mask 4b has an arcuate shape.

The auxiliary mask 5 has a role in adjusting the jet in the direction of the nozzle movement so as to reduce the side cuts securely at the portion that is masked by the sub mask 4b. Each of the auxiliary masks 5 has a stripe pattern in which seven long bands extend in parallel in the movement direction, and lateral ends of the auxiliary mask 5 protrude from the mask 30b by the length L11. This protrusion enhances the effect of the jet adjustment.

In addition, there is a following relationship concerning a width of a band that constitutes the pattern of the mask 30b.

$$L2>L1>L3$$

Here, L1 represents the width of bands except for both ends of the arrangement in the display area 10, L2 represents the width of the most outside band, and L3 represents the width of bands except for the most outside band in the non-display area 11. In this way, a patterning error of vanishing the most outside portion of the partition pattern can be prevented by setting the band width of the most outside portion to the largest value.

As explained above, the nozzle is moved in the vertical direction in FIG. 4 in the cutting process. Along with the movement of the nozzle, the cutting material is first ejected toward the auxiliary mask 5 located at the upper or the lower non-display area 11, then the cutting material is ejected toward the sub mask 4b, and further the cutting material is ejected toward the main mask 3b. Since the cutting process can be performed faster as the pattern gap of the mask is larger, the cutting action is the largest for the auxiliary mask 5. The auxiliary mask 5 has also a function for preventing excessive cutting of the sub mask 4b. If the auxiliary mask 5 is exfoliated and blown off, the sub mask 4b prevents excessive cutting for the main mask 3b.

Figure 6:
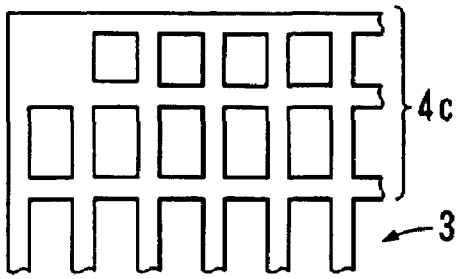
FIG. 6(A) is a diagram showing a first variation of a sub mask pattern.
FIG. 6(B) is a diagram showing a second variation of a sub mask pattern.
FIG. 6(C) is a diagram showing a third variation of a sub mask pattern.
Figure 6:
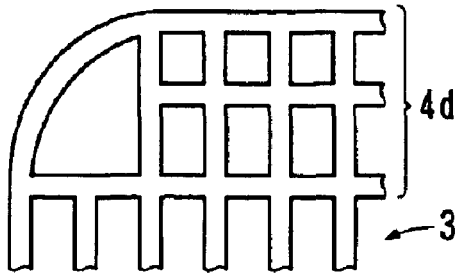
Figure 6:
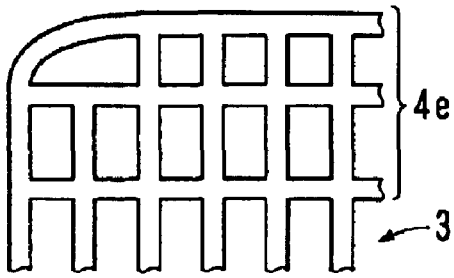
Figure 7:
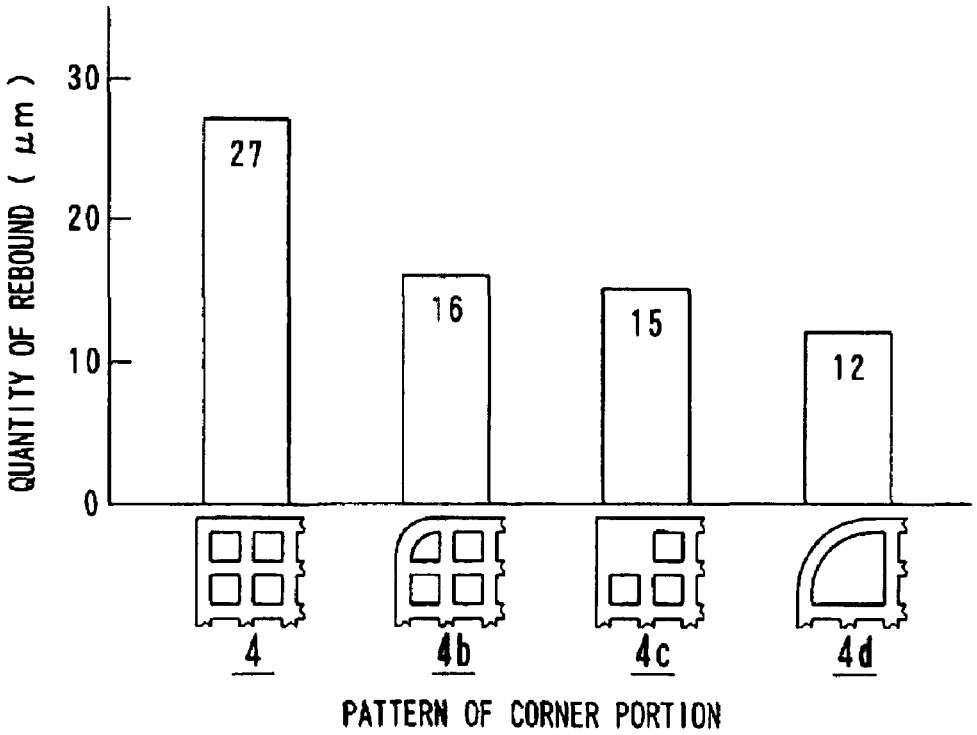
FIG. 7 is a diagram showing the relationship between a shape of a corner portion of a sub mask and quantity of a projection.

Making the corner portion of the sub mask 4b in an arcuate shape is effective for reducing the projection. It is considered to be important for the reason to distribute a stress due to contraction in the baking process so that the locally generated projection can be distributed and averaged. Concerning the pattern of the corner portion, there is a variation as shown in FIG. 6. The corner portion of a sub mask 4c as shown in FIG. 6(A) has a shape of a right-angled rim in which one of squares is filled. The corner portion of a sub mask 4d as shown in FIG. 6(B) has an arcuate shape having a radius twice the grid interval. The corner portion of a sub mask 4e as shown in FIG. 6(C) has a shape of laterally oblong arc. As shown in FIG. 7, the quantity of a projection depends on a shape of the corner portion. The quantity of a projection is less in the arcuate corner portion than in the angled corner portion. Also, the quantity of a projection is less in a large radius than in a small radius of the arc. Even the arc of small radius can realize the quantity of a projection of 16 μm or less that is effective for reducing operational sound. However, considering variation in a manufacturing process, it is desirable to set the quantity of a projection to 12 μm or less.

Figure 8:
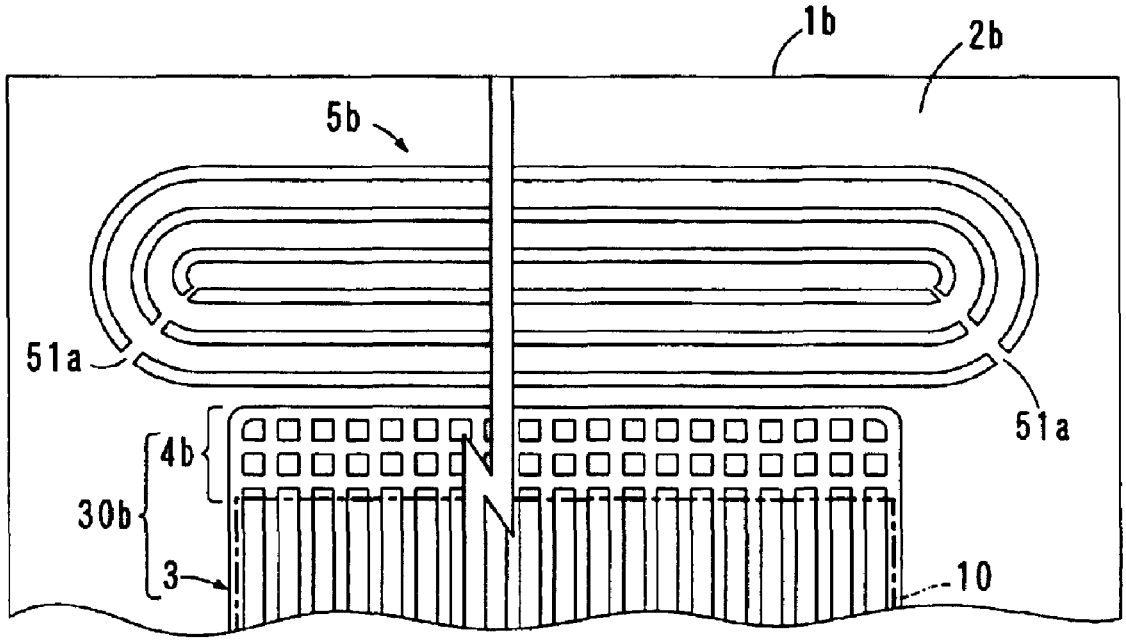
FIG. 8 is a plan view showing a first variation of an auxiliary mask pattern.

FIG. 8 is a plan view showing a first variation of an auxiliary mask pattern. The pattern of an auxiliary mask 5b is a pattern having three coaxial rings elongated in the lateral direction and consisting of half circles and lines. However, a slit 51a is formed in each half circle at each end of each ring, so the pattern of the auxiliary mask 5b is a discontinuous ring pattern in the strict sense. Since the slit 51a divides the ring, only a part of a ring is blown off if partial mask exfoliation occurs in the cutting process of the entire of one ring, and it is hard to occur that the entire of one ring is blown off.

The ring pattern is made by connecting both ends of a band with each other in the stripe pattern, and the exfoliation hardly occurs in it compared with the stripe pattern. Since ends of all rings including the most inside ring protrude from the mask 30b, the effect of protecting the mask 30b is enhanced.

Figure 9:
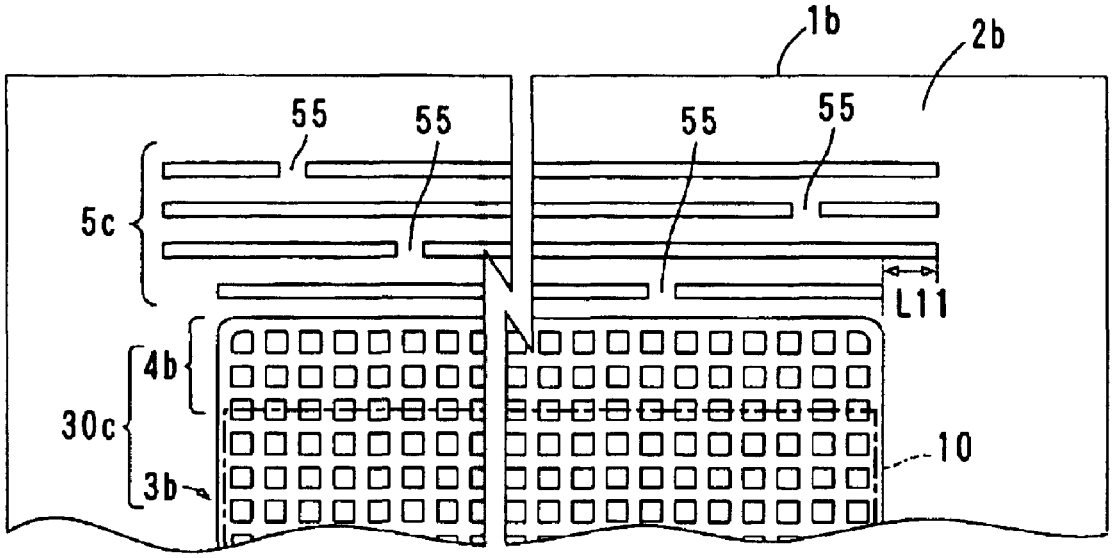
FIG. 9 is a plan view showing a second variation of an auxiliary mask pattern.

FIG. 9 is a plan view showing a second variation of an auxiliary mask pattern. In this example, the pattern of the partition mask 3b located at the display area 10 is a mesh pattern. An auxiliary mask 5c is positioned at the vicinity of a mask 30c that includes the main mask 3b and the sub mask 4b. The pattern of the auxiliary mask 5c is a stripe pattern in which a plurality of bands shorter than the entire length in the lateral direction of the display area 10 is arranged in the moving direction as a plurality of discontinuous lines that are parallel to each other. In this pattern, the jet can be controlled by setting the width of the slit 55 that divides the band of the stripe. There is also an effect that a portion that will be blown off is small when mask exfoliation occurs. The slits 55 are arranged so that the discontinuous points of plural discontinuous lines are shifted from each other, and thereby the jet is prevented from being enhanced locally in the sub mask 4b.

The both ends of the auxiliary mask 5c protrude from the mask 30b by the length L11. However, the band closest to the mask 30b among bands constituting the stripe pattern is not protruded from the mask 30b. The reason thereof is to make the exfoliation of a band that will contribute to the protection of the mask 30b most hard to happen. If this band is exfoliated at early stage, quantity of side cut of the sub partition increases compared with the case where other bands are exfoliated. Since the ends of the band are not protruded from the mask 30b, jet pressure will be weaken at the end of the band. Furthermore, the shape of the band that is closest to the mask 30b can be adopted also for the auxiliary mask of the embodiment as shown in FIG. 5.

Figure 10:
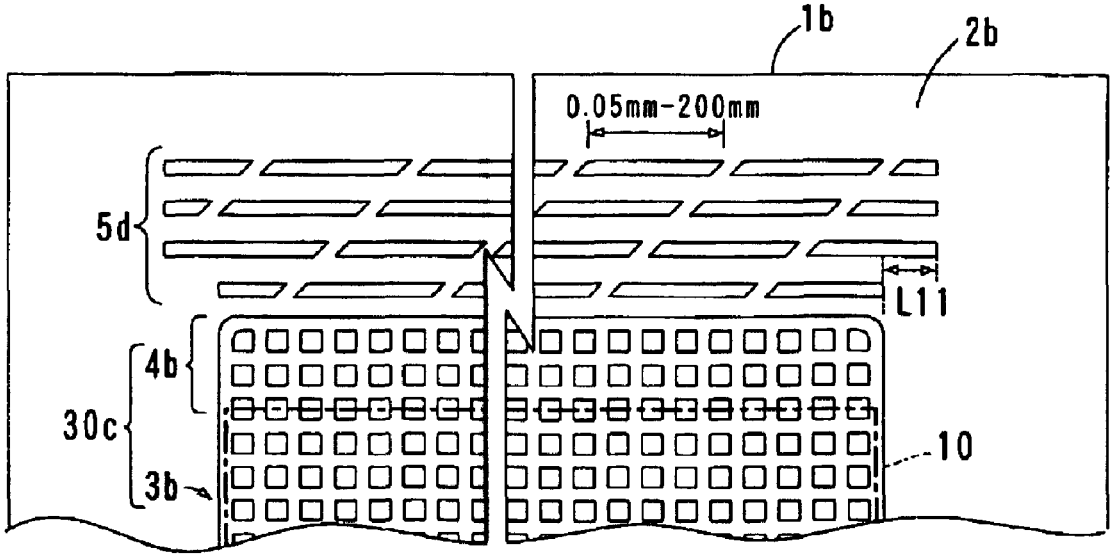
FIG. 10 is a plan view showing a third variation of an auxiliary mask pattern.

FIG. 10 is a plan view showing a third variation of an auxiliary mask pattern. Also in this example, the partition pattern is a mesh pattern. The pattern of an auxiliary mask 5d is a stripe pattern in which a plurality of bands sufficiently shorter than the entire length in the moving direction of the display area 10 is arranged in the moving direction as a plurality of discontinuous lines that are parallel to each other. In this pattern, it is important to set the length of the band of the stripe to a value within the range of 0.05-200 mm. The longer the band is, the easier the band can be entangled with a movable mechanism of a conveyor 91 (see FIG. 1) when it is blown off. The entanglement of a mask flake is not desirable for stability of the movement and for cleaning the conveyor 91. The above-mentioned range is a condition for easy collection by the filter 97 without any entanglement. The distance between the short bands arranged linearly is preferably about a fifth of the length of the band. In addition, a preferred condition considering reduction of the projection is that the width and the length of the band is less than 240 μm (=0.24 mm). It is confirmed by the experiment that when the condition is satisfied, the quantity of a projection becomes less than a few μm even if a side cut having the depth of 50 μm is generated either in the width direction or in the length direction. This can be explained that if the band is longer than 240 μm, the edge portion is pulled by shrink of the long portion so as to generate the projection while the projection is hardly generated if it is shorter than 240 μm since there is no pulling portion.

(Third Embodiment)

Figure 11:
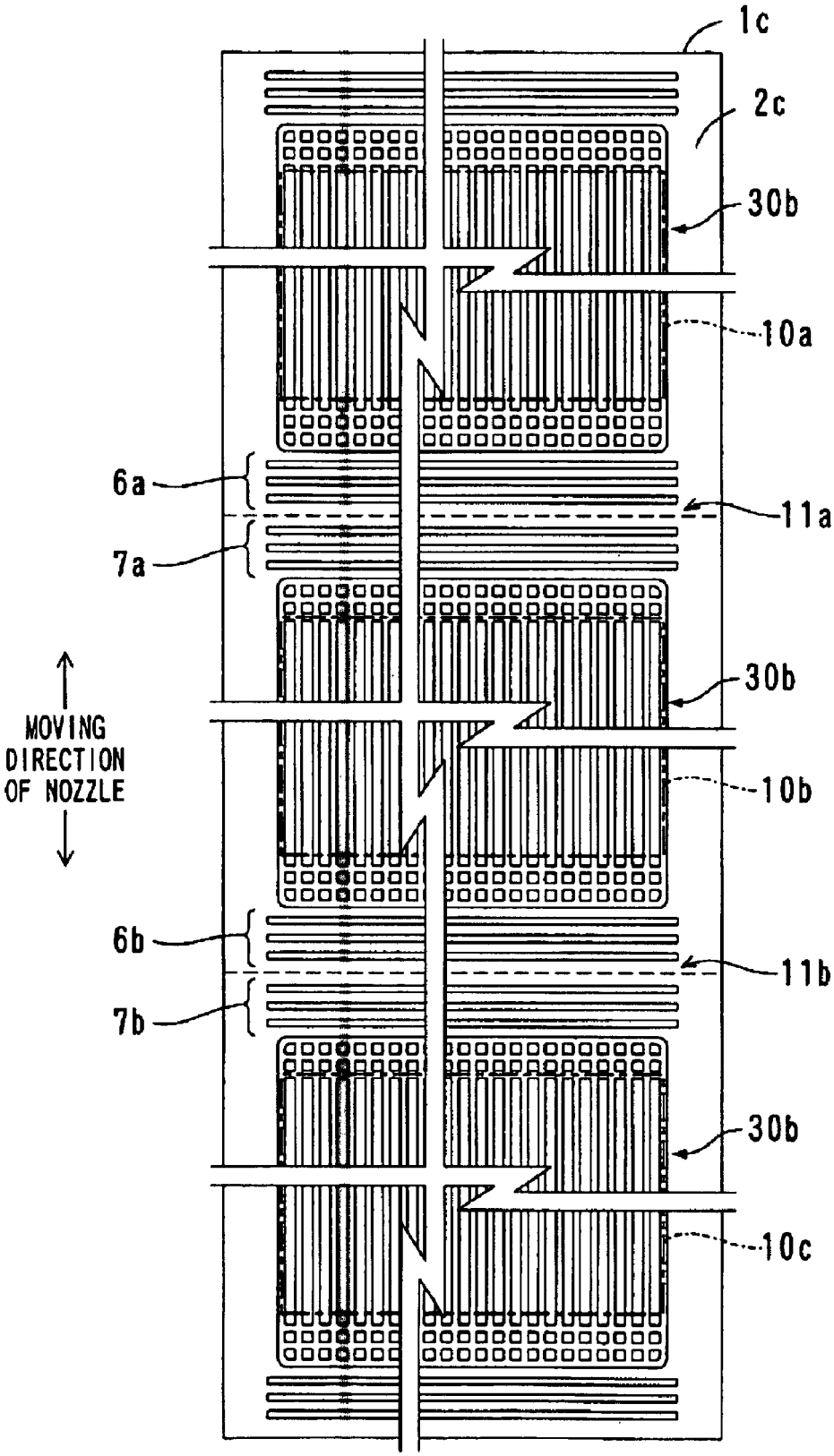
FIG. 11 is a plan view showing a mask pattern of a third embodiment.

FIG. 11 is a plan view showing a mask pattern of a third embodiment. The third embodiment is applied to a multiple making process in which partitions for a plurality of PDPs are formed on one substrate simultaneously, and then the substrate is divided. The example shown in FIG. 11 shows an example in which partitions for three PDPs are formed simultaneously, and each of the three display areas 10a, 10b and 10c in FIG. 11 corresponds to a partition portion of one PDP. The partition pattern of the PDP of the third embodiment is also a stripe pattern. The partition is formed by the process in the same way as the first embodiment, which includes patterning a sheet-like partition material 2c that covers the entire surface of a glass substrate 1c by using a sandblasting process and a mask 30b that is a unit of a main mask and a sub mask, and then baking the partition material 2c. The glass substrate 1c has a size of 1460 mm×1050 mm for manufacturing a 32-inch PDP.

The display areas 10a, 10b and 10c are arranged with a space along the vertical direction in FIG. 11, and one mask 30b is arranged for each of them. In addition, auxiliary masks 6a, 7a, 6b and 7b are formed in the non-display areas 11a and 11b between the neighboring display areas at the same time as formation of the mask 30b. The auxiliary masks 6a, 7a, 6b and 7b-reduce the jet pressure toward the sub partition that is formed by the mask 30b. When the nozzle is moved in the arrangement direction of the display area, the middle portion in the moving direction of the glass substrate 1c receives larger jet pressure than the end portions do. It is because that approximately a half of the jet deviates to the outside the glass substrate 1c at the end portions. The arrangement of the auxiliary masks 6a, 7a, 6b and 7b at portions that receive large jet pressure can prevent the mask 30b from being exfoliated, so that exact partitions as designed can be formed in the display areas 10a, 10b and 10c. In the photolithography process for forming the three masks 30b and the auxiliary masks 6a, 7a, 6b and 7b, a stepper type pattern exposure is performed in which one photo mask having a size corresponding to one PDP is used three times. For this reason, auxiliary masks are formed actually also for each of the display areas 10a, 10b and 10c similarly, as shown in FIG. 11.

As explained above, according to the present invention, concerning a projection based on the display portion, over the entire area of the partition forming portion including the sub partition portion and its corner portion and auxiliary partition portion, the quantity of a projection can be suppressed to 12 μm or less. Even if variation among manufactured panels is taken into account, it can be suppressed to 16 μm or less. Thus, operation sound (buzz sound) due to vibration during operation of the panel can be suppressed.

Though the present invention has been explained using various embodiments and variations, the present invention is not limited to these embodiments but can be realized in other embodiments.

INDUSTRIAL APPLICABILITY

The method for forming partitions according to the present invention enables formation of partitions having exact pattern and height as designed in a display area without generating projections that may disturb the contact between substrates. Therefore, it is useful for improving yields in manufacturing the plasma display panel that can be lowered due to patterning errors and for providing a plasma display panel that does not generate vibration sound due to insufficient contact between substrates.

What is claimed is:

[1. A method for forming partitions of a plasma display panel, the partitions dividing a discharge space of a plasma display panel, the method comprising the steps of:

providing a sheet-like partition material on a substrate that is a panel material, the partition material covering a display area and outside thereof on a surface of the substrate;

providing a mask for patterning on the partition material, the mask covering the display area and the outside thereof, so that a pattern of the portion arranged in the display area of the mask corresponds to the partitions, and a pattern of the portion arranged outside of the display area of the mask is a pattern for dividing a band-like portion along a rim of the display area as a grid;

patterning the partition material covered partially with the mask by a sandblasting process; and baking the partition material after the patterning.]

[2. The method for forming partitions of a plasma display panel according to claim 1, further comprising the steps of:

providing the mask so as to cover the display area and both sides thereof in a first direction; and moving a nozzle for ejecting a cutting material relatively to the partition material in the first direction in a reciprocating manner while patterning the partition material by the sandblasting process.]

[3. The method for forming partitions of a plasma display panel according to claim 2, further comprising the step of forming an auxiliary mask outside the mask in the first direction with a distance from the mask at the same time when forming the mask.]

[4. The method for forming partitions of a plasma display panel according to claim 3, wherein both ends of the auxiliary mask in a second direction that is perpendicular to the first direction protrudes from the mask.]

[5. The method for forming partitions of a plasma display panel according to claim 4, wherein the pattern of the auxiliary mask is a stripe pattern in which a plurality of long bands is arranged in parallel in the second direction.]

[6. The method for forming partitions of a plasma display panel according to claim 4, wherein the pattern of the auxiliary mask is a stripe pattern in which a plurality of long thin bands is arranged in parallel in the second direction and at least both ends of the band that is closest to the mask are not protruded from the mask.]

[7. The method for forming partitions of a plasma display panel according to claim 4, wherein the pattern of the auxiliary mask is a ring pattern that is oblong in the second direction.]

[8. The method for forming partitions of a plasma display panel according to claim 1, wherein a corner portion of the mask has an arcuate shape.]

[9. The method for forming partitions of a plasma display panel according to claim 4, wherein the pattern of the auxiliary mask is a pattern in which a plurality of bands that is shorter than the entire length of the display area in the second direction is arranged in parallel to each other as a plurality of discontinuous lines along the second direction.]

[10. The method for forming partitions of a plasma display panel according to claim 9, wherein discontinuous points are shifted from each other among the plural discontinuous lines in the pattern of the auxiliary mask.]

[11. The method for forming partitions of a plasma display panel according to claim 9, wherein the length of the band in the pattern of the auxiliary mask has a value within the range of 0.05-200 mm.]

[12. The method for forming partitions of a plasma display panel according to claim 9, wherein both the width and the length of the band in the pattern of the auxiliary mask have a value less than 240 μm.]

[13. The method for forming partitions of a plasma display panel according to claim 1, wherein at least the width of the band located at the most outside portion among the bands constituting a grid-like pattern of the portion arranged outside of the display area of the mask has a value within the range of 160-320 μm.]

[14. A method for forming partitions that divide a discharge space in each of plural plasma display panels simultaneously, the method comprising the steps of:

providing a sheet-like partition material on a substrate that is a panel material on which display areas corresponding to the plurality plasma display panels respectively are arranged linearly, the partition material covering the plural display areas and outside thereof on a surface of the substrate;

providing a mask for patterning on the partition material, the mask covering the inside and the outside of the display area for each display area, so that a pattern of the portion arranged in the display area of the mask corresponds to the partitions, and a pattern of the portion arranged outside of the display area of the mask is a pattern for dividing a band-like portion along a rim of the display area as a grid;

forming an auxiliary mask at least between neighboring masks with a distance from the mask at the same time when forming the mask;

patterning the partition material covered partially with the mask and the auxiliary mask by a sandblasting process; and baking the partition material after the patterning.]

*15. A plasma display panel, comprising:*

*a substrate;*

*a first partition area arranged in a display area on the substrate; and*

*second partition area arranged outside of the display area on the substrate;*

*wherein the first partition area includes a plurality of partitions extending at least in a first direction;*

*wherein the second partition area includes at least three first partitions extending in the first direction and at least three second partitions extending in a second direction, the first partitions extending in the first direction and the second partitions extending in the second direction extending transversely to one another; and*

*wherein a corner portion of the second partition area is arcuate.*

*16. A plasma display panel according to claim 15, wherein the second partition area further includes a third partition, and wherein the third partition forms the corner portion of the second partition area and has an arcuate shape.*

*17. A plasma display panel according to claim 16, wherein an edge portion of the third partition is connected to an edge portion of the outermost first partition and another edge portion of the third partition is connected to an edge portion of the outermost second partition.*

*18. A plasma display panel according to claim 16, wherein the third partition has an entirely curved shape extending from an edge portion connected to an edge portion of the outermost first partition to another edge portion connected to an edge portion of the outermost second partition.*

*19. A plasma display panel according to claim 15, wherein the first partition area corresponds to a rectangular display area, and wherein the second partition area extends along at least one edge of the rectangular display area.*

*20. A plasma display panel according to claim 19, wherein the second partition area extends along a longer edge of the rectangular display area.*

*21. A plasma display panel according to claim 15, wherein a projection formed at the corner portion of the second partition area has a height which is not greater than 16 μm.*

*22. A plasma display panel according to claim 21, wherein the projection has a height which is not greater than 12 μm.*

*23. A plasma display panel according to claim 21, wherein the first partition area corresponds to a rectangular display area, and wherein the second partition area extends along at least one edge of the rectangular display area.*

*24. A plasma display panel according to claim 15, wherein the first and second partitions are formed by a sandblasting method.*

*25. A plasma display panel, comprising:*

*a substrate;*

*a first partition area arranged in a display area on the substrate; and*

*a second partition area arranged outside of the display area on the substrate;*

*wherein the first partition area includes a plurality of horizontal partitions and vertical partitions;*

*wherein the second partition area includes a plurality of horizontal partitions and a plurality of vertical partitions, the horizontal partitions and the vertical partitions intersect one another, forming a plurality of first cells arranged in a plurality of rows and a plurality of columns; and*

*wherein a second cell is formed in a corner portion of the second partition area and has an arcuate partition.*

*26. A plasma display panel according to claim 25, wherein the second cell is formed by the outermost horizontal parti-*

*tion, the outermost vertical partition and a third partition which is the arcuate partition, and wherein the third partition connects an edge portion of the horizontal partition and an edge portion of the vertical partition.*

*27. A plasma display panel according to claim 25, wherein the second partition area extends along a longer edge of the rectangular display area.*

*28. A plasma display panel according to claim 25, wherein a projection formed at the corner portion of the second partition area has a height which is not greater than 16 μm.*

*29. A plasma display panel according to claim 28, wherein the projection has a height which is not greater than 12 μm.*

*30. A plasma display panel according to claim 25, wherein the horizontal and vertical partitions are formed by a sandblasting method.*

*31. A plasma display panel, comprising:*

*a substrate;*

*a first partition area arranged in a display area on the substrate; and*

*a second partition area arranged outside of the display area on the substrate;*

*wherein the first partition area includes a plurality of partitions;*

*wherein the second partition area includes a plurality of first partitions and a plurality of second partitions which extend transversely to one another and form first cells;*

*wherein the second partition area further includes third partitions forming second cells; and*

*wherein at least one of the second cells has a size greater than at least one of the first cells.*

*32. A plasma display panel according to claim 31, wherein in a horizontal direction, a length of the second cell is greater than a length of an adjacent first cell.*

*33. A plasma display panel according to claim 31, wherein in a vertical direction, a length of the second cell is greater than a length of an adjacent first cell.*

*34. A plasma display panel according to claim 31, wherein in the horizontal direction, a length of the second cell corresponds to a length of a plurality of adjacent first cells.*

*35. A plasma display panel according to claim 31, wherein in the vertical direction, a length of the second cell corresponds to a length of a plurality of adjacent first cells.*

*36. A plasma display panel according to claim 31, wherein the second cell is arranged in a corner portion of the second partition area.*

*37. A plasma display panel according to claim 36, wherein the third partition of the second cell has an arcate shape.*

*38. A plasma display panel according to claim 31, wherein the first partition area corresponds to a rectangular display area, and wherein the second partition area extends along at least one edge of the rectangular display area.*

*39. A plasma display panel according to claim 31, wherein the second partition area extends along a longer edge of the rectangular display area.*

*40. A plasma display panel according to claim 31, wherein a projection formed at a corner portion of the second partition area has a height which is not greater than 16 μm.*

*41. A plasma display panel according to claim 40, wherein the projection has a height which is not greater than 12 μm.*

*42. A plasma display panel according to claim 31, wherein all of the partitions are formed by a sandblasting method.*

*43. A plasma display panel, comprising:*

*a substrate;*

*a first partition area arranged in a display area on the substrate; and*

*a second partition area arranged outside of the display area on the substrate;*

*wherein the first partition area includes a plurality of partitions extending at least in a first direction;*

*wherein the second partition area includes a plurality of first partitions and a plurality of second partitions, the first partitions and the second partitions extending transversely to one another; and*

*wherein an outermost partition of the second partition area has a thickness greater than a thickness of inner partitions in the second partition area.*

*44. A plasma display panel according to claim 43, wherein the outermost partition in the second partition area has a thickness greater than a thickness of inner partitions in the first partition area.*

*45. A plasma display panel according to claim 44, wherein a projection formed at a corner portion of the second partition area has a height which is not greater than 16 μm.*

*46. A plasma display panel according to claim 45, wherein the projection has a height which is not greater than 12 μm.*

*47. A plasma display panel according to claim 44, wherein all of the partitions are formed by a sandblasting method.*

* * * * *

UNITED STATES PATENT AND TRADEMARK OFFICE

CERTIFICATE OF CORRECTION

PATENT NO. : RE42,405 E
APPLICATION NO. : 12/328197
DATED : May 31, 2011
INVENTOR(S) : Fujinaga et al.

It is certified that error appears in the above-identified patent and that said Letters Patent is hereby corrected as shown below:

On the Title Page, should read,

Item (60) Division of application No. 11/705,796, filed on Feb. 14, 2007, now Pat. No. Re. 41,312, which is a continuation of application No. PCT/JP02/03362, filed on April 3, 2002.

Signed and Sealed this
Sixteenth Day of August, 2011

David J. Kappos

David J. Kappos
*Director of the United States Patent and Trademark Office*